US008649964B2

(12) United States Patent
Kizaki

(10) Patent No.: US 8,649,964 B2
(45) Date of Patent: Feb. 11, 2014

(54) OTHER VEHICLE INFORMATION PROVIDING DEVICE

(75) Inventor: Tokujiro Kizaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 105 days.

(21) Appl. No.: 13/239,634

(22) Filed: Sep. 22, 2011

(65) Prior Publication Data

US 2012/0083998 A1 Apr. 5, 2012

(30) Foreign Application Priority Data

Sep. 30, 2010 (JP) ................................. 2010-222818

(51) Int. Cl.

| | |
|---|---|
| ***G05D 1/02*** | (2006.01) |
| ***G06F 17/10*** | (2006.01) |
| ***G01M 17/00*** | (2006.01) |
| ***G08G 1/00*** | (2006.01) |
| ***G08G 1/16*** | (2006.01) |

(52) U.S. Cl.
USPC ......... 701/300; 701/301; 701/29.3; 701/31.5; 340/901; 340/903

(58) Field of Classification Search
USPC ......... 701/300, 301, 29.3, 13.5; 340/901, 903
See application file for complete search history.

(56) References Cited

U.S. PATENT DOCUMENTS

2006/0271258 A1* 11/2006 Salmeen et al. ................ 701/45

FOREIGN PATENT DOCUMENTS

| | | |
|---|---|---|
| EP | 1435601 A2 * | 7/2004 |
| JP | 3923572 B2 | 3/2007 |

* cited by examiner

*Primary Examiner* — Fadey Jabr
*Assistant Examiner* — Basil T Jos
(74) *Attorney, Agent, or Firm* — Squire Sanders (US) LLP

(57) ABSTRACT

An other vehicle information providing device, can be configured to assign priority to a plurality of other vehicle information inputted to the own vehicle and provides other vehicle information having high priority. The other vehicle information providing device includes a priority memory means for storing priority information. An information switching index value calculation means which predicts future priority after a lapse of a predetermined period based on the stored priority information, which can include latest priority and priority previous to the latest priority, and calculates an information switching index value based on the latest priority, the priority previous to the latest priority, the priority before the priority previous to the latest priority and the future priority. An information providing means provides other vehicle information based on the information switching index value.

8 Claims, 5 Drawing Sheets

OTHER VEHICLE INFORMATION PROVIDING DEVICE

BACKGROUND

1. Field

The present invention relates to an other vehicle information providing device which allows moving bodies such as vehicles to perform transmission/reception (inter-vehicle communication) of positional information therebetween and provides drive support information on traveling based on the positional information of both vehicles to one vehicle.

2. Description of the Related Art

Recently, there has been proposed a drive support system which can confirm a position, a traveling direction and a speed of another vehicle or other vehicles (other vehicle) with respect to one's own vehicle (own vehicle) by exchanging information by inter-vehicle communication using a short-range radio.

This system, due to the inter-vehicle communication within a fixed range of the own vehicle, for example, by receiving information on a type of other vehicle, positional information on other vehicle, information on a traveling state of other vehicle such as a speed, a direction, can acquire information on traveling states, relative positions and the like of a plurality of other vehicles present on a periphery of the own vehicle.

In such a drive support system, vehicles constituting objects which provide drive support information to the own vehicle are basically some vehicles among a plurality of other vehicles which are present within a communication range of the own vehicle. Accordingly, the drive support system calculates priorities based on information acquired from the respective vehicles, and determines the order of priorities, and displays information on the vehicles having high priority. Such a system is disclosed, for example, in Japanese Patent No. 3923572. The drive support system calculates the order of priorities once for every system time (for example, 0.5 seconds), switches information on the object vehicle so that the drive support system can provide information on other vehicle having high priority at this point of time with sound or with an image display.

SUMMARY

However, according to the above-mentioned drive support system, when the priority is switched in the middle of providing information and the switching of information on the target vehicle is frequently performed, a content of provided information is changed immediately thus giving rise to a possibility that a driver of the vehicle cannot sufficiently recognize the provided information. This is because a time necessary for providing information must be at least a time during which one can recognize the information (for example, a time necessary for reproducing 1 phrase when information is sound) so that time necessary for providing information becomes longer compared to an information acquisition interval (system time).

To consider a case where the drive support system provides other vehicle information to the own vehicle by the inter-vehicle communication, although the drive support system wants to provide the information having high priority to the own vehicle in a timely manner, an error may occur in accuracy of information such as speeds or positions for calculating priority since both the own vehicle and other vehicles are moving bodies. In such a case, the priority fluctuates more than necessary thus giving rise to a possibility that the switching of information on the target vehicles is frequently performed.

Further, also considered is a case where priority delayed from an actual environment is prepared due to a delay in time spent from the detection of information to be acquired to the providing of information through transmission/reception.

Accordingly, there have been expectations for a drive support system which can prevent a driver from having difficulty in recognizing currently displayed information due to interruption of information and also can realize to provide a timely information in conformity with an actual environment.

The present invention has been proposed in view of the above-mentioned circumstances, and it is an object of the present invention to provide an other vehicle information providing device which, in providing other vehicle information to own vehicle based on positional information on vehicles by inter-vehicle communication, timely provides other vehicle information which a driver can always recognize.

To achieve the above-mentioned object, according to one embodiment, in an other vehicle information providing device which assigns priority to a plurality of other vehicle information inputted to an own vehicle in inter-vehicle communication established between the own vehicle and a plurality of other vehicles and provides other vehicle information having high priority, the improvement is characterized by numerous features.

A priority memory means can store the latest priority and priority previous to the latest priority with a predetermined period with respect to the plurality of other vehicle information.

An information switching index value calculation means can predict future priority after a lapse of a predetermined period based on the latest priority and the priority previous to the latest priority stored in the priority memory means, calculate an information switching index value based on the latest priority, the priority previous to the latest priority and the future priority, and substitute the information switching index value as final priority.

An information providing means can provide information having the highest information switching index value.

The invention according to another embodiment can include a drive support system which, when a distance between the own vehicle and other vehicle is a predetermined distance or less, perform transmission/reception of at least a speed and positional information between the own vehicle and other vehicle thus providing drive support information for own vehicle with respect to other vehicle, and calculate the priority based on the speed and the positional information acquired through the transmission/reception.

The invention according to another embodiment, is such that the future priority is a prediction value calculated proportionally based on at least the latest priority and the priority previous to the latest priority.

The invention according to another embodiment is such that the information switching index value calculation means calculates an information switching index value by averaging four priorities consisting of the latest priority, the priority previous to the latest priority, priority before the priority previous to the latest priority with a predetermined period and the future priority, and sets the calculated information switching index value as the information switching index, and sets the other vehicle information having a high information switching index value as information having high priority.

The invention according to another embodiment is such that the information switching index value calculation means calculates, when the four priorities are not stored, the information switching index value based on the priority including at least the latest priority.

The invention according to another embodiment, is such that the priority memory means, when other vehicle goes outside a communication range of the own vehicle, erases information containing priority of other vehicle stored in the priority memory means.

The invention according to another embodiment is such that the other vehicle information providing device further includes an output information determination means which determines whether or not the information having the high information switching index value is currently provided. When the output information determination means determines that the information having the high information switching index value is currently provided, the information switching index value of the information having the high information switching index value is increased.

The invention according to another embodiment is such that the output information determination means further determines whether or not other vehicle information is information which is already provided in the past within a predetermined period. When the output information determination means determines that other vehicle information is the information provided in the past within the predetermined period, the information switching index value of the information is decreased.

The invention according to another embodiment is such that the providing of other vehicle information to a driver is performed by at least an audio output device and a visual output device. The other vehicle information providing device includes an output control means which selects the output device to which the information is provided out of the plurality of output devices. The output control means outputs the information having the highest information switching index value to at least one of the audio and visual output devices and also outputs other information to a remaining output device provided that the remaining output device is empty, and other information is outputted by the visual output device when other information is information in front of the own vehicle and other information is outputted by the audio output device when other information is information behind the own vehicle.

According to the first embodiment, the information switching index value calculation means can systematically calculate the information switching index value (switching timing) of the information based on the priorities at points of time consisting of the present (the latest priority), the past (the priority previous to the latest priority and the priority before the priority previous to the latest priority) and the future (the future priority). Therefore, even when information such as a speed or a position, for example, includes an error or the like, it is possible to prevent occurrence of frequent switching of information to be provided. Accordingly, the present invention is preferably applicable to a vehicle on which a drive support system where an object to which information is provided after deciding priority is a dynamic object (vehicle) is mounted, for example.

Further, in calculating the information switching index value by the information switching index value calculation means, the information switching index value calculation means is configured to predict the future priority. Therefore, the switching timing of the information can be calculated timely with no delay whereby it is possible to provide more accurate other vehicle information to a user (own vehicle) at proper timing.

According to the second embodiment, in the vehicle on which the drive support system where the object to which information is provided after deciding priority is a dynamic object (moving body) is mounted, it is possible to prevent the frequent switching of the other vehicle information provided to the own vehicle.

According to the third embodiment, the future priority is calculated by prediction based on the past priorities (the priority previous to the latest priority and the priority before the priority previous to the latest priority) and the latest priority. Therefore, the accuracy of prediction value can be enhanced.

According to the fourth embodiment, the information switching index value can be calculated with the simple constitution, and it is also possible to prevent the frequent switching of provided other vehicle information by filtering the acquired information.

According to the fifth embodiment, the information switching index value can be formed based on the priorities including at least the latest priority. Therefore, it is possible to provide the information timely.

According to the sixth embodiment, with respect to holding of past priority information, when the information is no longer associated with the latest information, the stored information including the priority of other vehicle can be erased. Therefore, storing of non-necessary past information can be prevented whereby a storage capacity of the priority memory means can be decreased.

According to the seventh embodiment, the information switching index value can be maintained high with respect to the other vehicle information which is being provided currently. Therefore, the frequent switching of the currently provided other vehicle information to other information can be prevented. Further, when the information switching index value of the other information is elevated significantly, the currently provided other vehicle information can be switched to the other information. Therefore, the more accurate filtering can be secured.

According to the eight embodiment, the information switching index value can be maintained low with respect to the information which is already provided. Therefore, it is possible to prevent the information from being provided again frequently, and also when the information switching index value of the information which is already provided is elevated significantly, the currently provided other vehicle information can be switched to the information which is already provided. Therefore, the more accurate filtering can be secured.

According to the ninth embodiment, the other vehicle information providing device determines whether or not the other information is information in front of or behind the own vehicle and outputs the information by the empty output device based on the determination when the empty device is present. Therefore, the other vehicle information providing device can provide a plurality of information without causing confusion with the information having highest priority.

Further, by differentiating the output device between the information on the vehicle in front of the own vehicle and the information on the vehicle behind the own vehicle, the driver can also easily recognize the content of the information.

DETAILED DESCRIPTION

One example of an embodiment of an other vehicle information providing device according to the present invention is explained in conjunction with drawings. In this example, the other vehicle information providing device is a device which is used in a drive support system which confirms a position, a traveling direction and a speed of other vehicle (other vehicle) with respect to one's own vehicle (own vehicle) by exchanging information by vehicle-vehicle communication (inter-vehicle communication) using a short-range radio.

The explanation is made hereinafter by taking, as an example, the drive support system which provides drive support information for traveling of the own vehicle with respect to other vehicles based on information (speed and positional information) acquired by the inter-vehicle communication when the own vehicle is a motorcycle, for example, and a distance between the own vehicle and other vehicle (including four-wheeled vehicle) is a predetermined distance or less within a communication range of the own vehicle.

Figure 1:
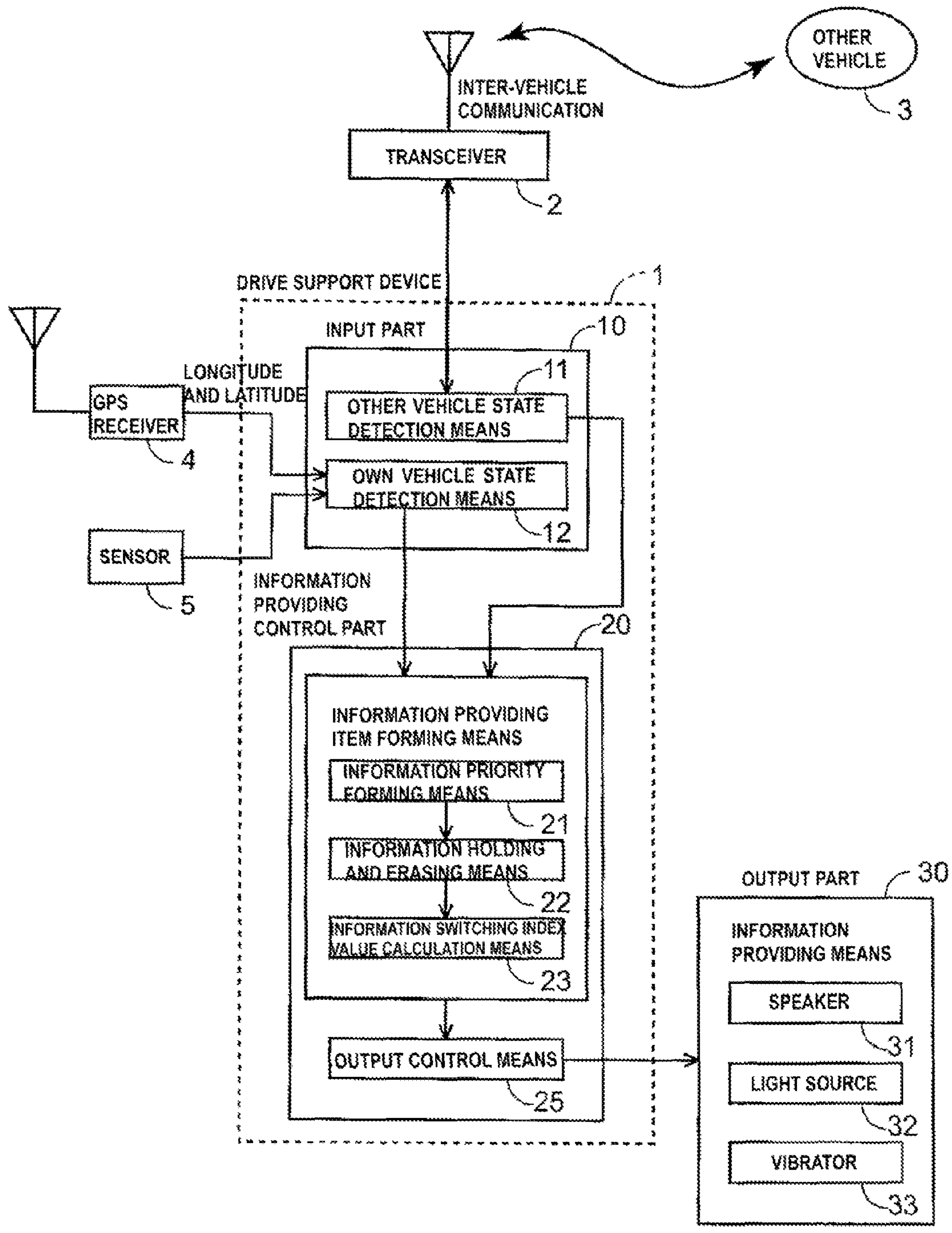
FIG. 1 is a block diagram showing one example of an embodiment of an other vehicle information providing device according to the present invention.

The drive support system can be, as shown in FIG. 1, configured such that a drive support device 1, a transceiver 2, a GPS receiver 4 and various types of sensors 5 are mounted on the own vehicle. The drive support system can receive other vehicle information from other vehicle 3, receive longitude and latitude information of the own vehicle from the GPS receiver 4, and can receive own vehicle traveling information from the various types of sensors 5 respectively, and provides drive support information to the own vehicle based on these information.

The transceiver 2 acquires other vehicle information from other vehicle 3 traveling within a communication range which is a fixed range about the own vehicle by the inter-vehicle communication, and the inter-vehicle communication is performed at a communication speed of 10 Hz (transmission of 10 times per second), for example. The communication speed of the inter-vehicle communication may be changed corresponding to a vehicle speed. As other vehicle information, the transceiver 2 can acquire information on a type of vehicle (two-wheeled vehicle, ordinary four-wheeled vehicle, large-size four-wheeled vehicle or the like), a position, a speed and a direction of the vehicle, for example.

Further, the transceiver 2 may acquire traffic jam information by receiving passing of other vehicles through places where a light beacon, an ETC or the like is installed via road-vehicle communication.

The GPS receiver 4 receives the longitude and latitude information on the own vehicle, and can acquire an own vehicle position obtained by a GPS and node link information based on a map database.

Various sensors 5 can obtain a vehicle speed, acceleration, direction, inclination (in case of a two-wheeled vehicle) or the like of the own vehicle by a sensor which detects a vehicle speed or a gyro sensor.

The drive support device 1 is constituted of an input part 10 to which information from the transceiver 2, the GPS receiver 4 and the sensors 5 are inputted, and an information providing control part 20 which outputs other vehicle information based on the inputted information.

The input part 10 can include an other vehicle state detection means 11 which performs sensing of other vehicle and an own vehicle state detection means 12 which performs sensing of the own vehicle. Other vehicle information obtained from the transceiver 2 by the inter-vehicle communication and information obtained by making use of the road-vehicle communication (infrastructure) are inputted to the other vehicle state detection means 11. Information relating to the own vehicle state such as a position, a speed, acceleration, and a direction, inclination, and a switching state of the own vehicle from the GPS receiver 4 and the various sensors 5 are inputted to the own vehicle state detection means 12. The own vehicle state detection means 12 has the map database so that the own vehicle state detection means 12 can grasp a position of the own vehicle at a present point of time with respect to an intersection present in the traveling direction.

The information providing control part 20 includes an information priority forming means 21 which forms other vehicle information and priority based on inputted information, an the information holding and erasing means 22 which stores or erases the formed information, an information switching index value calculation means 23 which calculates an information switching index value based on the stored information, and an output control means 25 which performs outputting of information based on the calculated information switching index value.

The information providing control part 20, in performing the inter-vehicle communication between the own vehicle and a plurality of other vehicles, assigns priority among a plurality of other vehicle information inputted to the own vehicle and outputs other vehicle information having high priority.

The information priority forming means 21, based on respective information from the other vehicle state detection means 11 and the own vehicle state detection means 12, calculates time to collision (TTC) for every system time (for example, 0.5 seconds) by taking directions and distances from the own vehicle to other vehicles and speeds of both vehicles into consideration for a plurality of respective vehicles (other vehicles) from which the information are received, and stores the TTC after assigning priority. The TTC is calculated based on distances from the own vehicle and other vehicles to an intersection present in the traveling direction of the own vehicle and current speeds of the own vehicle and other vehicles.

Priority is the order of priorities in providing the other vehicle information to the own vehicle, and is calculated based on the speed and the positional information acquired by the inter-vehicle communication. To be more specific, high priority is assigned to other vehicle information relating to other vehicle whose TTC time is the shortest with respect to the own vehicle. This priority is also recalculated once for every system time (for example, 0.5 seconds). With respect to priority, stepwise ranks may be set corresponding to calculated values (for example, TTC time).

The information holding and erasing means (priority memory means) 22 stores a plurality of calculated other vehicle information and the order of priorities of these other vehicle information, and also erases other vehicle information which are no more necessary. With respect to the priority of each other vehicle information, the latest priority, priority previous to the latest priority with a predetermined time, priority before the priority previous to the latest priority with a predetermined time are respectively stored.

Figure 2:
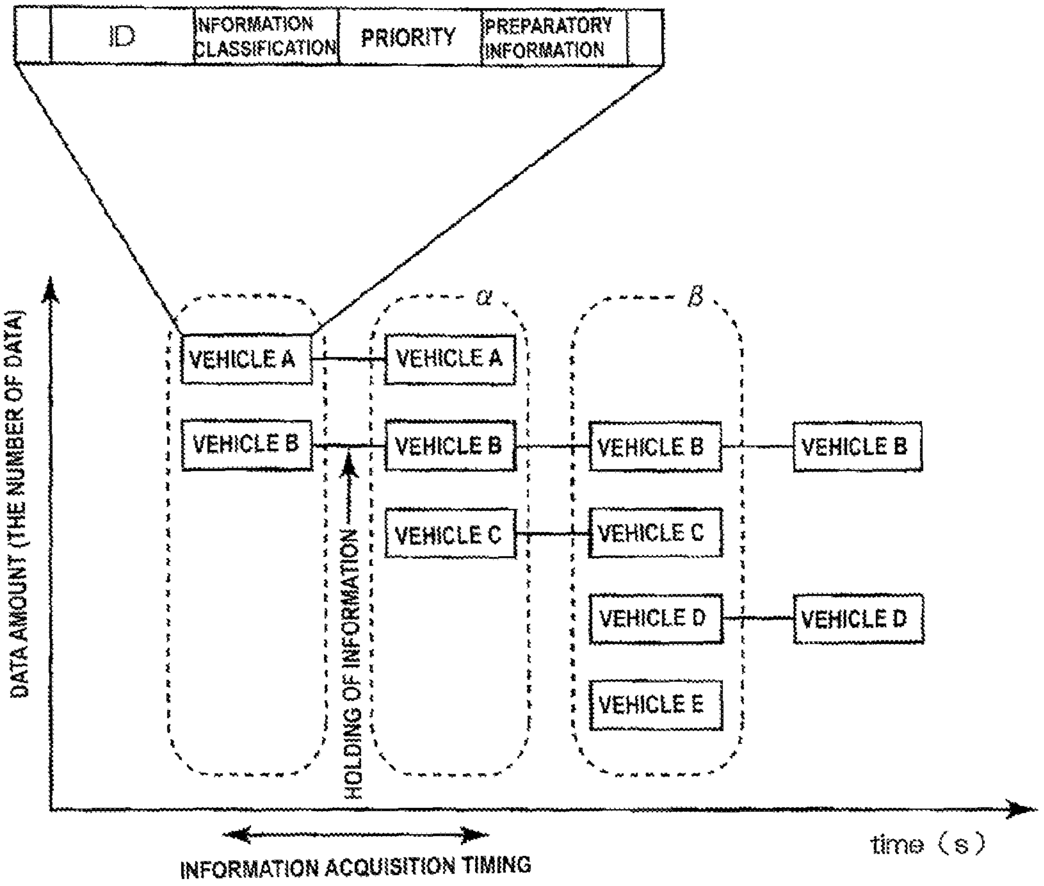
FIG. 2 is a schematic view showing a state where respective vehicle information exist at a plurality of information acquisition timings by inter-vehicle communication.

The other vehicle information to be stored is, as shown in FIG. 2, constituted of areas where target vehicle IDs, information classification, information priorities and preparatory information are stored respectively. The target vehicle IDs are numbers which are given to differentiate the plurality of other vehicles and types of vehicles. The information classification is provided for identifying kinds of information, and differentiates front, rear, left and right "attention directions" of an other vehicle present position with respect to the own vehicle, for example. The information priority is displayed with a formed value and a rank. The preparatory information includes information relating to "information providing state" described later.

Further, when a distance between the own vehicle and other vehicle becomes larger than a predetermined distance (when other vehicle goes out from a communication range), processing of erasing stored information containing the priority of other vehicle is executed.

With respect to each other vehicle information, for every information acquisition timing (system time: 0.5 seconds), other vehicle which is present within the communication range of the own vehicle at this timing becomes an object for other vehicle information. For example, to consider a case where information on a vehicle A, information on a vehicle B and information on a vehicle C are acquired at information acquisition timing a, when the information on the vehicle A and the information on the vehicle B are acquired at information acquisition timing previous to the information acquisition timing α, the information on the vehicles A, B is held. Further, at the information acquisition timing α, holding of the information on the vehicle C which becomes a new object is started.

At information acquisition timing β, the vehicle A goes out from the communication range so that the information on the vehicle A is erased, the information on the vehicles B, C is held, and information on a vehicle D and a vehicle E is newly acquired. Priorities of the information on the vehicles B to E are calculated at the information acquisition timing β. Here, by referencing the information on the vehicles B to E at the information acquisition timing α using ID and by referencing priorities of the vehicle B and the vehicle C at the information acquisition timing α, the priorities previous to the latest priorities of the vehicle B and the vehicle C can be acquired, and it is also understood that the vehicle D and the vehicle E are novel information. In the same manner, the priority before the priority previous to the latest priority can be acquired with respect to the vehicle B.

The information switching index value calculation means 23 predicts future priority after a lapse of a predetermined period (0.5 seconds) based on the latest priority and the priority previous to the latest priority (0.5 seconds before the latest priority) stored in the information holding and erasing means (priority memory means) 22, and calculates an information switching index value based on the latest priority, the priority previous to the latest priority (0.5 seconds before the latest priority), the priority before the priority previous to the latest priority (1.0 second before the latest priority) and the future priority (0.5 seconds after the latest priority).

The future priority is a prediction value calculated by performing a proportional calculation using the latest priority and the priority previous to the latest priority which are calculated and stored.

That is, a current information switching index value is calculated by averaging four priorities consisting of the latest priority, the priority previous to the latest priority, the priority before the priority previous to the latest priority which are calculated and stored, and the predicted future priority. The information switching index value becomes an index for determining the information to be provided to the own vehicle when a plurality of other vehicle information are present, and the information switching index value is used in place of priority. Further, with respect to the information switching index value, it may be possible to make ranks which are taken in a stepwise manner correspond to the information switching index value as information switching indexes.

Figure 3:
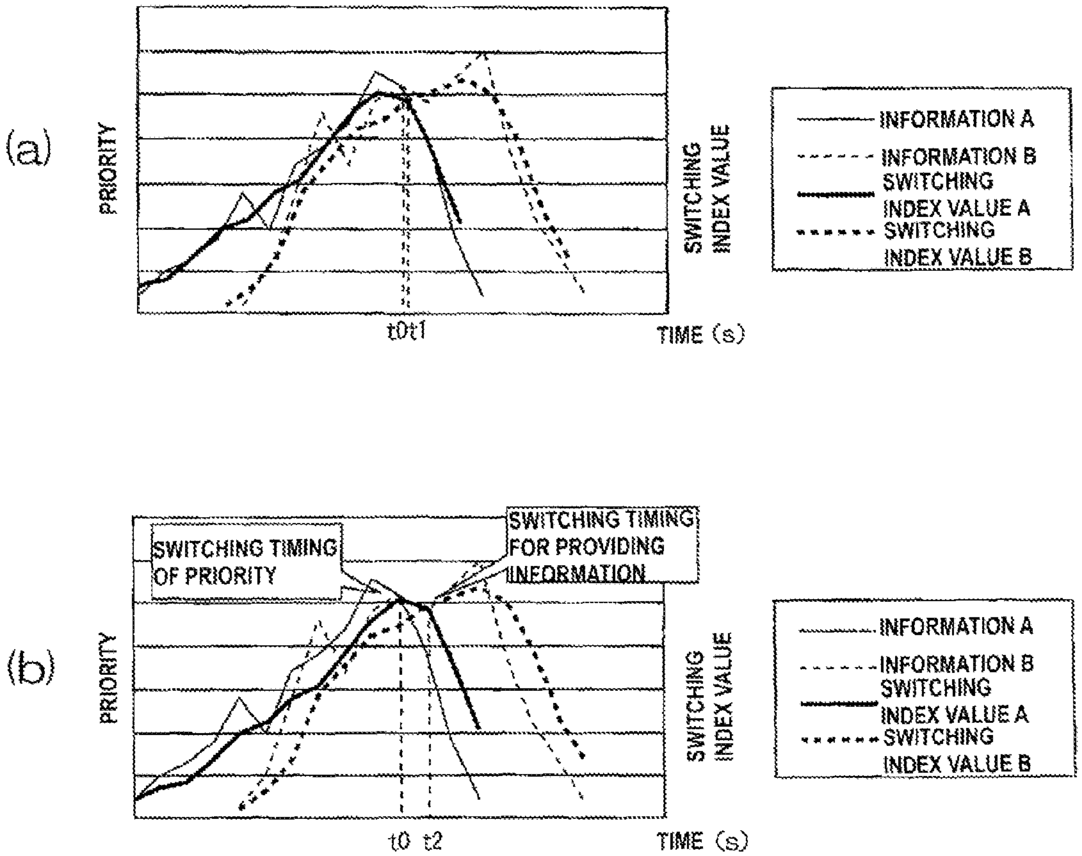
FIG. 3(*a*) is a graph showing a change of a switching index value and a change of priority calculated by an information switching index value calculation means of the other vehicle information providing device according to the present invention, and FIG. 3(*b*) a graph showing a change of a switching index value and a change of priority calculated by a different calculation method for comparison with the present invention.

For example, as shown in FIG. 3(*a*), when priority with respect to information A on a certain vehicle for every system time (0.5 second) changes as indicated by a fine solid line, and priority with respect to information B on other vehicle changes as indicated by a fine dotted line, an information switching index value acquired by averaging above-mentioned four priorities including the latest priority, the priority previous to the latest priority, the priority before the priority previous to the latest priority and the future priority is indicated such that the information switching index value with respect to the information A is indicated by a bold solid line, and the information switching index value with respect to the information B is indicated by a bold dotted line.

In this graph, the priority of the information A and the priority of the information B are set such that the priority of the information A is higher than the priority of the information B initially, the priority of the information B becomes higher than the priority of the information A thereafter, the priority of the information A becomes higher than the priority of the information B again, the priority of the information B becomes higher than the priority of the information A at a point of time t0, and the priority of the information B is held in a higher state than the priority of the information A thereafter. To express this change by focusing only on which information is higher, the change is expressed as shown in FIG. 4(*a*).

Figure 4:
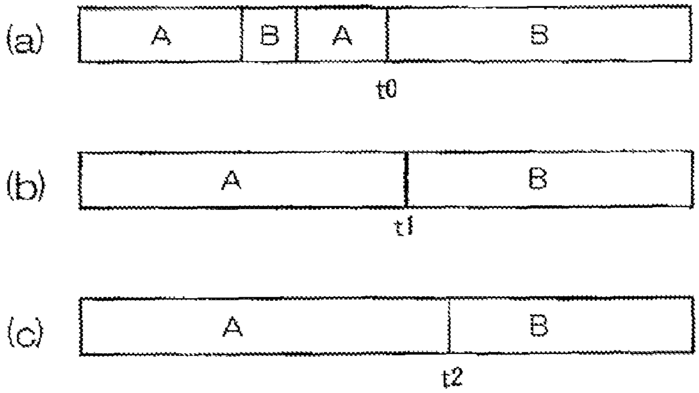
FIGS. 4(*a*) and 4(*b*) are schematic views showing examples of switching timings for providing information, wherein FIG. 4(*a*) shows a case where switching timing is determined based on priority, FIG. 4(*b*) shows a case where switching timing is determined based on an information switching index value calculated by the information switching index value calculation means according to the present invention, and (*c*) shows a case where switching timing is determined based on an information switching index value corresponding to FIG. 2(*b*).

Then, the switching timing between the information A and the information B based on the information switching index value becomes a point of time t1 where the information switching index value of the information B becomes higher than the information switching index value of the information A (see FIG. 3(*a*) and FIG. 4(*b*)).

In FIG. 3(*b*), when the priority of the information A changes as indicated by a fine solid line and the priority of the information B changes as indicated by a fine dotted line in the same manner as the priorities shown in FIG. 3(*a*), an information switching index value is acquired by averaging three priorities including the latest priority, the priority previous to the latest priority and the priority before the priority previous to the latest priority without taking the future priority into consideration, and the information switching index value with respect to the information A is indicated by a bold solid line and the information switching index value with respect to the information B is indicated by a bold dotted line. In this graph, the switching timing between the information A and the information B based on the information switching index value becomes a point of time t2 (see FIG. 3(*b*) and FIG. 4(*c*)).

That is, when the information switching index value is acquired by averaging three priorities including the latest priority, the priority previous to the latest priority and the priority before the priority previous to the latest priority without taking the future priority into consideration, the information to be provided is switched from the information A to the information B at the point of time t2 more delayed from a point of time t0 which is the switching timing of priority than the point of time t1 and hence, delay of switching timing occurs (see FIG. 4(*c*)).

The above-mentioned information switching index value calculation means 23 acquires the information switching index value by averaging four priorities including the latest priority, the priority previous to the latest priority, the priority before the priority previous to the latest priority and the future priority, and performs the switching of information based on the information switching index value. Accordingly, it is possible to prevent frequent switching of information which occurs when switching of information is carried out by taking only priority into consideration as shown in FIG. 4(*a*) and, as shown in FIG. 4(*b*), switching of information can be performed at the timing t1 which is near the switching timing t0 of priority so that timely switching of information can be realized.

Although the information switching index value is calculated by averaging the plurality of priorities in FIG. 3, when the information switching index is expressed by stepwise ranks corresponding to the calculated information switching index value, switching timing is determined by comparing the ranks to each other.

Further, the information switching index value calculation means 23 may include an output information determination means which determines whether or not information having a high information switching index value is currently provided. The output information determination means determines that the information switching index value is currently provided by the information switching index value included in the preparatory information (FIG. 2) in other vehicle information as information on "information providing state".

When the output information determination means determines that the information having a high information switching index value is currently provided, by increasing the information switching index value of the information having the high information switching index value by adding a predetermined value to the information having the high information switching index value, the other vehicle information providing device can easily provide other vehicle information corresponding to the increased information switching index value in a succeeding information providing operation.

Further, the output information determination means determines whether or not other vehicle information is already provided within a predetermined period in the past, and when there is the information which is provided within the predetermined period in the past, an information switching index value of the information may be decreased. The output information determination means determines that the information switching index value is selected in the past by the information switching index value included in the preparatory information (FIG. 2) in other vehicle information as information on "information providing state".

When the output information determination means determines that there is the information selected in the past, by decreasing the information switching index value by subtracting a predetermined value from the information switching index value, it is possible to make a case where other vehicle information corresponding to the decreased information switching index value is provided again hardly occur in a succeeding information providing operation.

The output control means 25 provides other vehicle information having a high information switching index value via an information providing means 30 mounted on a vehicle body. The information providing means 30 can include a speaker (audio output device) 31 which is mounted on one's own vehicle (own vehicle) or in the inside of a helmet, a light source (visual output device) 32 which is mounted in the inside of a meter mounted on a front side of a handle bar or inside a front cover, an vibrator 33 which is mounted on a portion in the vicinity of a seat and the like. In this manner, the information providing means 30 is configured to allow a driver (rider) to visually and auditorially recognize other vehicle information. The output control means 25 performs a control of selecting the output device to which information is provided out of the plurality of output devices based on the information classification in other vehicle information (FIG. 2). That is, the output control means 25 determines which one of "front, rear, left, right" is "attention direction" which is information relating to the information classification in other vehicle information, and provides the information to a proper output device among the plurality of output devices.

For example, with respect to the providing of the other vehicle information by the output control means 25, the output control means 25 provides the information by turning on the light source 32 when the other vehicle information is information in front of the own vehicle (information indicating that other vehicle is approaching the own vehicle from a front side or other vehicle is approaching the own vehicle from a left or a right side in front of the own vehicle or the like) or by generating sound from the speaker 31 or by generating vibrations from the vibrator 33 when the other vehicle information is information behind the own vehicle (information indicating that other vehicle is approaching the own vehicle from behind or the like) so that a driver can recognize a kind of other vehicle information. Further, information having the highest information switching index value may be outputted to at least one of the speaker 31 and the light source 32, and the information on other vehicle may be outputted to the remaining output device when the output device is empty.

Figure 5:
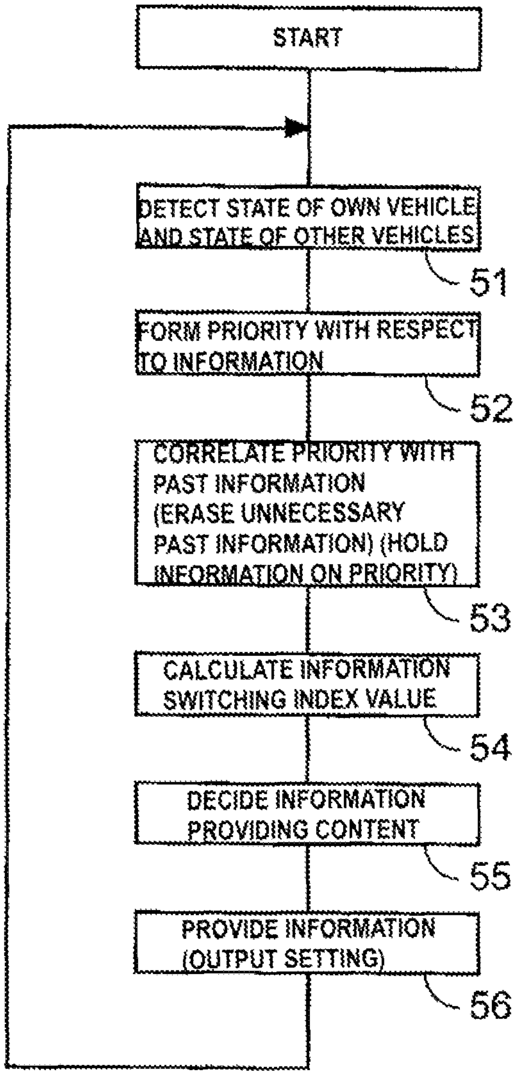
FIG. 5 is a flowchart showing processing steps executed by the information switching index value calculation means of the other vehicle information providing device according to the present invention.

Next, processing steps in the input part 10 and the information providing control part 20 of the drive support device 1 are explained in conjunction with a flowchart shown in FIG. 5.

Using the other vehicle state detection means 11 and the own vehicle state detection means 12, states (positions, directions, vehicle speeds and the like) of a plurality of other vehicles present within a communication range of own vehicle are detected by inter-vehicle communication using the transceiver 2, and a state (position, vehicle speed and the like) of the own vehicle is also detected by the GPS receiver 4 and the sensors 5 whereby distances to an intersection, current vehicle speeds and the like are detected (step 51).

The information priority forming means 21 adopts information on detected "directions" of other vehicles as other vehicle information, and forms priority with respect to the respective other vehicle information (step 52). The calculation of the priority is performed such that a TTC (predicted times until both the own vehicle and other vehicles meet) is calculated based on a distance to an intersection arranged in the advancing direction of the own vehicle and current speeds of both own vehicle and other vehicle. When a plurality of vehicles are present within the communication range, the highest priority is assigned to the vehicle having the short TTC.

The formed priority is stored in the information holding and erasing means 22 together with other vehicle information corresponding to the priority, and other vehicle information on other vehicles away from the communication range of the own vehicle is erased together with priority (step 53).

Next, the information switching index value calculation means 23 forms an information switching index value based on the respective priorities (step 54). The information switching index value is calculated by averaging four priorities consisting of the latest priority, the priority previous to the latest priority, the priority before the priority previous to the latest priority and the future priority of the same vehicle with respect to other vehicle information. The information switching index value may be calculated by averaging five or more priorities.

Further, when priorities for averaging are not stored, the information switching index value may be formed based on priority which includes at least the latest priority, and currently acquired latest priority may directly substitute the information switching index value. By executing such processing, the information switching index value can be formed based on the priority which includes at least the latest priority and hence, the timely providing of information can be realized.

The output control means 25 acquires the information having the highest information switching index value by comparison, and determines the information as other vehicle information to be provided (step 55). With respect to the other vehicle information which is determined to be provided, the output control means 25 selects an output mode of the other vehicle information, and the information providing means 30 outputs the other vehicle information (step 56).

Figure 6:
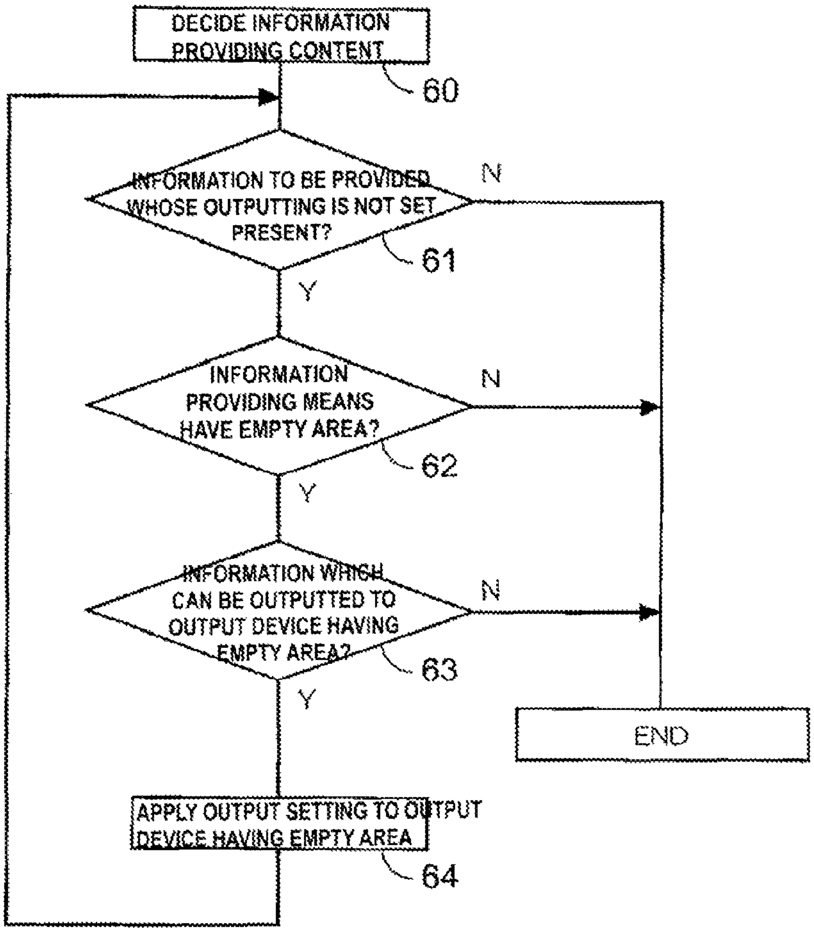
FIG. 6 is a flowchart showing processing steps executed by an output control means in the other vehicle information providing device according to the present invention.

Steps of outputting the determined other vehicle information are explained in conjunction with a flowchart shown in FIG. 6.

An information providing content is determined (step 60), and the information having the highest information switching index value is outputted by the information providing means 30. Thereafter, it is determined whether or not information to be provided whose outputting is not set is present (step 61). When the information to be provided whose outputting is not set is present, it is determined whether or not the information providing means 30 has an empty area (step 62). When it is determined that the information providing means 30 has the empty area, other information other than the information having the highest information switching index value is provided to an empty output device (information providing means 30).

Other information is not limited to positional information on other vehicle, and includes map information or general information such as weather. Further, when the information providing means is empty, these general information may be outputted to the empty information providing means immediately.

In this embodiment, further, it is determined whether or not the information is information which can be outputted (step 63). When it is determined that the information is the information which can be outputted, the information whose outputting is set is outputted (step 64). In step 63, when the information is the information behind the own vehicle, the information is outputted by the audio output device (speaker 31), while when the information is the information in front of the own vehicle, the information is outputted by the visual output device (light source 32). This selection flow of the output device is preferable when other information is the positional information on other vehicle.

In the above-mentioned steps, between step 55 and step 56, it may be possible to insert a step where it is determined whether or not a determined information providing content is currently being provided, and when it is determined that the determined information providing content is being provided, a predetermined value is added to the calculated information switching index value.

Further, it may be possible to insert a step where it is determined whether or not the information is provided in the past for every information, and when it is determined that the information is provided in the past, a predetermined value is subtracted from the information switching index value of the information.

According to the above-mentioned drive support system, the information switching index value calculation means 23 can systematically calculate the information switching index value (switching timing) of the information based on the priorities at points of time consisting of the present (the latest priority), the past (the priority previous to the latest priority and the priority before the priority previous to the latest priority) and the future (the future priority) and hence, it is possible to prevent the occurrence of frequent switching of information to be provided. Accordingly, in a vehicle on which a drive support system where an object to which information is provided after deciding priority is a dynamic object (vehicle) is mounted, it is possible to prevent the frequent switching of information to be provided. Further, the information switching index value is calculated by taking the future priority into consideration and hence, there is no delay in the switching timing of the information whereby it is possible to realize the timely switching of other vehicle information.

Description of Reference Numerals and Signs

1: drive support device, 2: transceiver, 3: other vehicle, 4: GPS receiver, 5: sensor, 10: input part, 11: other vehicle state detection means, 12: own vehicle state detection means, 20: information providing control part, 21: information priority forming means, 22: information holding and erasing means (priority memory means), 23: information switching index value calculation means, 25: output control means, 30: information providing means, 31: speaker (audio output device), 32: light source (visual output device), 33: vibrator

The invention claimed is:

1. An other vehicle information providing device, comprising:

a priority memory configured to store latest priority and priority previous to the latest priority within a predetermined period with respect to a plurality of other vehicle information;

an information switching index value calculation unit configured to predict future priority after a lapse of a predetermined period based on the latest priority and the priority previous to the latest priority stored in the priority memory, and to calculate an information switching index value based on the latest priority, the priority previous to the latest priority, and a future priority, and configured to substitute the information switching value switching index value as final priority; and an information providing unit configured to provide other vehicle information based on the information switching index value, wherein the other vehicle information providing device assigns priority to the plurality of other vehicle information inputted to an own vehicle in inter-vehicle communication established between the own vehicle and a plurality of other vehicles, and provides other vehicle information having high priority, and wherein the information switching index value calculation unit is also configured to calculate an information switching index value by averaging four priorities including the latest priority, the priority previous to the latest priority, priority before the priority previous to the latest priority with a predetermined period, and the future priority, and also is configured to set the calculated information switching index value as the information switching index, and is configured to set the other vehicle information having a high information switching index value as information having high priority.

2. The other vehicle information providing device according to claim 1, further comprising:

a drive support unit configured to, when a distance between the own vehicle and said other vehicle is a predetermined distance or less, perform transmission/reception of at least a speed and positional information between the own vehicle and said other vehicle, thus providing drive support information for traveling the own vehicle with respect to said other vehicle, and also configured to calculate the priority based on the speed and the positional information acquired through the transmission/reception.

3. The other vehicle information providing device according to claim 1, wherein the future priority is a prediction value calculated proportionally based on at least the latest priority and the priority previous to the latest priority.

4. The other vehicle information providing device according to claim 1, wherein the information switching index value calculation unit is also configured to calculate, when said four priorities are not stored, the information switching index value based on the priority including at least the latest priority.

5. The other vehicle information providing device according to claim 2, wherein the priority memory, when said other vehicle goes outside a communication range of the own vehicle, is configured to erase information containing priority of said other vehicle stored in the priority memory.

6. The other vehicle information providing device according to claim 1, further comprising an output information determining unit configured to determine whether or not the information having the high information switching index value is currently provided, wherein when the output information determining unit determines that the information having the high information switching index value is currently provided, the information switching index value of the information having the high information switching index value is increased.

7. The other vehicle information providing device according to claim 6, wherein the output information determining unit is also configured to determine whether or not said other vehicle information is information which is already provided within a predetermined period, and when the output information determining unit determines that the other vehicle information is the information provided within the predetermined period, the information switching index value of the information is decreased.

8. The other vehicle information providing device according to claim 1, further comprising:

an audio output unit configured to provide said other vehicle information to a driver;

a visual output unit, configured to provide said other vehicle information to a driver;

an output control unit configured to select the output unit to which the information is provided out of the plurality of output units, wherein the output control unit is configured to output the information having the highest information switching index value to at least one of the audio output unit and the visual output unit and also outputs other information to a remaining output unit provided that the remaining output unit is empty, and said other information is outputted by the visual output unit when said other information is information in front of the own vehicle and said other information is outputted by the audio output unit when said other information is information behind the own vehicle.

* * * * *